US012571654B2

(12) United States Patent　　(10) Patent No.:　US 12,571,654 B2

Heinz et al.　　(45) Date of Patent:　Mar. 10, 2026

(54) MAGNETIC-FIELD-BASED POSITION DETERMINATION DEVICE AND METHOD FOR MAGNETIC-FIELD-BASED POSITION DETERMINATION

(71) Applicant: Infineon Technologies AG, Neubiberg (DE)

(72) Inventors: Richard Heinz, Munich (DE); Stephan Leisenheimer, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 156 days.

(21) Appl. No.: 18/488,153

(22) Filed: Oct. 17, 2023

(65) Prior Publication Data

US 2024/0142273 A1　　May 2, 2024

(30) Foreign Application Priority Data

Oct. 31, 2022　　(DE) ......................... 102022211548.1

(51) Int. Cl.
　　*G01D 5/14*　　　　(2006.01)
(52) U.S. Cl.
　　CPC ........... *G01D 5/14* (2013.01); *G01D 2205/18* (2021.05)
(58) Field of Classification Search
　　None
　　See application file for complete search history.

(56) References Cited

U.S. PATENT DOCUMENTS

| | | | | |
|---|---|---|---|---|
| 9,063,190 | B2 * | 6/2015 | Garshelis | ............. G01R 33/123 |
| 2009/0128139 | A1 * | 5/2009 | Drenth | ................... G01D 5/145 |
| | | | | 324/207.22 |

(Continued)

FOREIGN PATENT DOCUMENTS

| | | | | |
|---|---|---|---|---|
| DE | 102010003292 A1 | 9/2011 | | |
| EP | 1243897 A1 * | 9/2002 | ............. | G01D 5/145 |

(Continued)

OTHER PUBLICATIONS

Morse, Application Note: Linear Hall-Effect Sensor Measurement Theory, Implementation, and Calibration; Texas Instruments, SLYA036B, Jul. 2018. (Year: 2018).*

(Continued)

*Primary Examiner* — Rodney E Fuller

(74) *Attorney, Agent, or Firm* — Harrity & Harrity, LLP

(57)　　　　　ABSTRACT

A magnetic-field-based position determination device includes a sensor device with at least two magnetic field sensors arranged spaced apart from each other by a distance and with a magnet movable relative to the sensor device. Each of the two magnetic field sensors is configured to measure the magnetic field emanating from the magnet in at least a first spatial direction and a different second spatial direction and, based thereon, to determine a magnetic field vector angle, respectively, wherein the first magnetic field sensor determines a first magnetic field vector angle, and wherein the second magnetic field sensor determines a second magnetic field vector angle. The sensor device is configured to determine the current position of the magnet relative to the sensor device based on the determined magnetic field vector angles and the distance of the two magnetic field sensors from each other.

13 Claims, 8 Drawing Sheets

(56)　　　　　References Cited

U.S. PATENT DOCUMENTS

| | | | | |
|---|---|---|---|---|
| 2009/0256553 A1* | 10/2009 | Dmytriw | ................ | G01B 7/003 |
| | | | | 324/207.21 |
| 2015/0050013 A1* | 2/2015 | Cadugan | .................. | G02B 7/08 |
| | | | | 702/150 |
| 2015/0068341 A1* | 3/2015 | Andreasen | .............. | F16H 59/68 |
| | | | | 74/473.11 |
| 2019/0310111 A1 | 10/2019 | Werth et al. | | |
| 2020/0191546 A1* | 6/2020 | Schmitt | .................. | G01R 33/09 |
| 2023/0100898 A1* | 3/2023 | Festjens | ................ | G01D 5/145 |
| | | | | 324/207.2 |

FOREIGN PATENT DOCUMENTS

| | | | | | | |
|---|---|---|---|---|---|---|
| EP | | 2581707 A1 | | 4/2013 | | |
| EP | | 2918978 A1 | | 9/2015 | | |
| EP | | 3617657 A1 | * | 3/2020 | ............. | G01B 7/003 |
| EP | | 3667248 A1 | * | 6/2020 | ............. | G01B 7/003 |
| JP | | 2008304222 A | | 12/2008 | | |

OTHER PUBLICATIONS

C. Wang, et al., Application Note: 3D Hall-Effect Sensor for Knobs in Appliances; Texas Instruments, SLYA080, Jul. 2023. (Year: 2023).*

D. Texas Instruments, Application Note: Angle Measurement with Multi-Axis Linear Hall-Effect Sensor, Texas Instruments, SLBAA463A, Jan. 2021. (Year: 2021).*

* cited by examiner

Positon determination along the x-axis

MAGNETIC-FIELD-BASED POSITION DETERMINATION DEVICE AND METHOD FOR MAGNETIC-FIELD-BASED POSITION DETERMINATION

CROSS-REFERENCE TO RELATED APPLICATION

This application claims priority to German Patent Application No. 102022211548.1 filed on Oct. 31, 2022, the content of which is incorporated by reference herein in its entirety.

TECHNICAL FIELD

The innovative concept described herein relates to a position determination device as well as a method for position determination using magnetic field sensors. The device as well as the method can be used in an industrial environment or also in the home user sector.

BACKGROUND

A well-known example of magnetic-field-based position determination is the measurement of a linear movement or a linear position. Here, a magnet is moved along a linear path past a magnetic field sensor, which determines the current position of the magnet based on the measured magnetic field. The magnetic field is a vector field, which is why it makes sense to determine the position of the magnet by measuring the so-called magnetic field vector angle. This designates the angle at which the magnetic field vectors impinge on the magnetic field sensor. Depending on the position of the magnet, the magnetic field vectors impinge on the magnetic field sensor at different magnetic field vector angles.

An advantage of such devices is that the measurement of the magnetic field angle depends only on the angle of incidence of the magnetic field vectors, but not on the absolute field strength of the magnet. This form of magnetic-field-based position determination is therefore very robust and insensitive to magnetic field fluctuations, e.g., changes in the magnetic field strength or the sensitivity of the magnetic field sensor have no effect on the measurement results.

The magnet moving along the linear path moves past the magnetic field sensor at a certain distance. This distance is also referred to as the air gap. In contrast to the magnetic field strength, however, a variation in the airgap can very well lead to falsified measurement results, which can lead to inaccuracies in the position determination. The airgap should therefore be as invariable as possible. Depending on the application, however, this is not always possible, for example, due to design-related tolerances or inaccuracies during installation and removal by the end user.

A practical example would be the brew group of a coffee machine. The brew group can move up and down during coffee preparation. A magnet mounted on the brew group in this case moves past an immovably mounted magnetic field sensor. The magnetic field sensor and the magnet mounted on the brew group are at a predetermined distance from each other. The user can now remove the brew group from the machine, for example for cleaning. If the user does not subsequently reinsert the brew group quite accurately, alignment errors can occur, so that the distance between the magnet and the magnetic field sensor deviates compared to the previous state. This leads to deviations in the position determination of the brew group, which in the best case may lead to flavor losses in the brewed coffee, but in the worst case may lead to failure of the coffee machine.

It would therefore be desirable to improve existing magnetic-field-based positioning devices to make them more robust to changes in the airgap and thus provide more reliable measurement results.

SUMMARY

Implementations are directed to a magnetic-field-based position determination device and a corresponding method for magnetic-field-based position determination. Further implementations and advantageous aspects of the magnetic-field-based position determination device as well as the corresponding method are described.

According to the innovative concept described herein, a magnetic-field-based position determination device is proposed, which, among other things, comprises a sensor device with at least two magnetic field sensors arranged at a distance d from each other. Furthermore, the position determination device comprises a magnet movable relative to the sensor device. Each of the two magnetic field sensors is configured to measure the magnetic field emanating from the magnet in at least a first spatial direction (e.g., z-direction) and a different second spatial direction (e.g., x-direction) and to determine a magnetic field vector angle based thereon, respectively, wherein the first magnetic field sensor determines a first magnetic field vector angle $\alpha$, and wherein the second magnetic field sensor determines a second magnetic field vector angle $\beta$. The sensor device is configured to determine the current position of the magnet relative to the sensor device based on the determined magnetic field vector angles $\alpha$, $\beta$ and the distance d between the two magnetic field sensors (position=$f(\alpha, \beta, d)$).

The innovative concept described herein further proposes a corresponding method for position determination using a magnetic-field-based position determination device. The method comprises, among other things, a step of providing a sensor device having at least two magnetic field sensors spaced apart from each other at a distance d. A further step includes providing a magnet movable relative to the sensor device. According to the method, the magnetic field emanating from the magnet is measured using the individual magnetic field sensors, more specifically in each case in at least a first spatial direction (e.g., z-direction) and a second spatial direction (e.g., x-direction) different therefrom. Based on this measurement result, a magnetic field vector angle is then determined in each case, wherein a first magnetic field vector angle $\alpha$ is determined using the first magnetic field sensor, and wherein a second magnetic field vector angle $\beta$ is determined using the second magnetic field sensor. The current position of the magnet relative to the sensor device is then determined based on the determined magnetic field vector angles $\alpha$, $\beta$ and the distance d between the two magnetic field sensors (position=$f(\alpha, \beta, d)$).

BRIEF DESCRIPTION OF THE DRAWINGS

Some example implementations are shown by way of example in the drawings and are explained below. In the drawings.

DETAILED DESCRIPTION

In the following, example implementations will be described in greater detail with reference to the figures, wherein elements with the same or similar function are provided with the same reference signs.

Method steps illustrated or described within the scope of the present disclosure can also be carried out in a sequence other than that illustrated or described. Furthermore, method steps relating to a specific feature of a device are interchangeable with the very same feature of the device, and this also applies the other way around.

Figure 1:
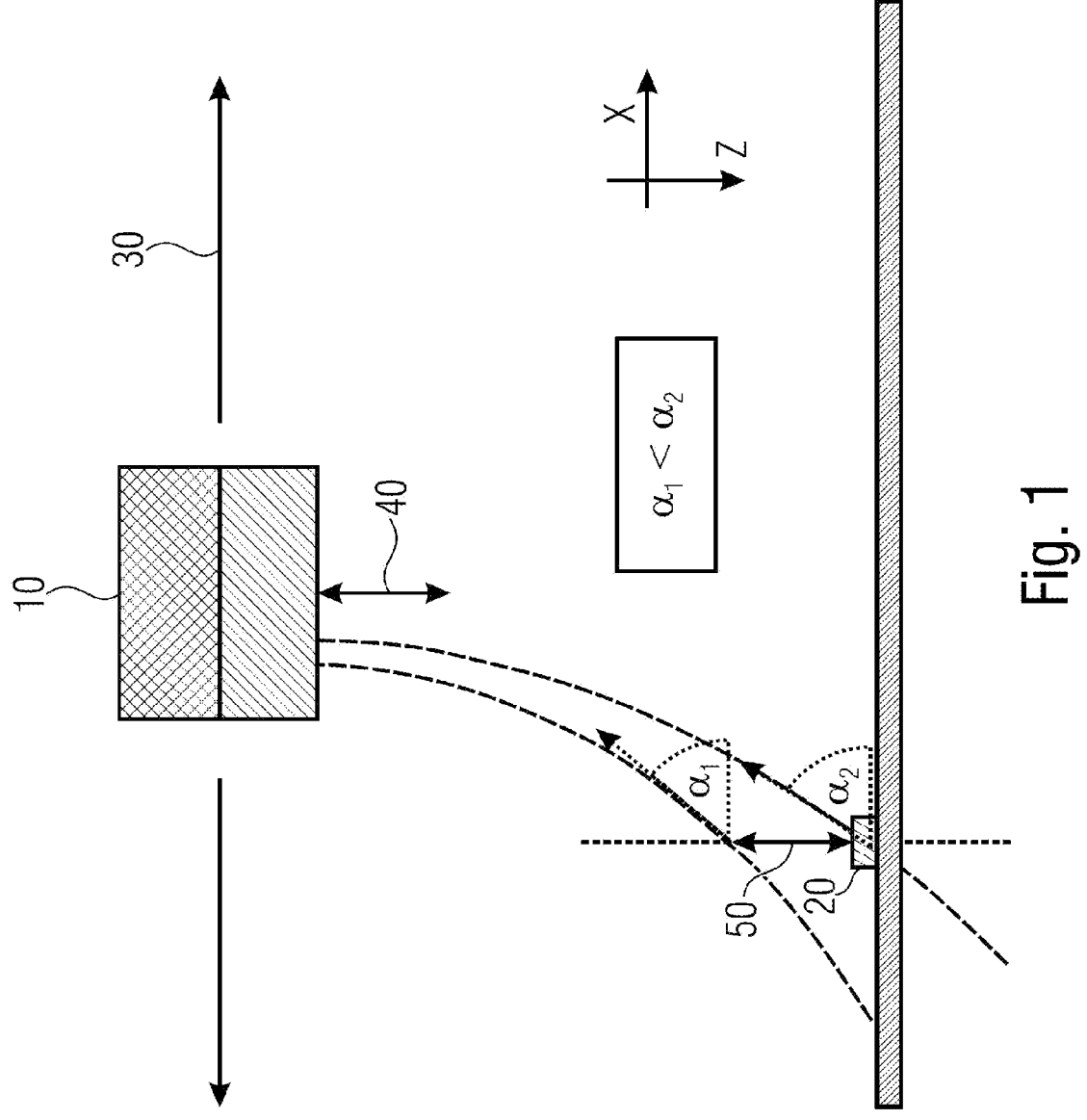
FIG. 1 shows a schematic side view of a conventional magnetic-field-based position determination device.

FIG. 1 first shows, by way of introduction, the basic concept of a conventional magnetic-field-based position determination device having a magnet 10 and a magnetic field sensor 20 spaced apart therefrom (e.g., in the z-direction). The magnet 10 can be moved back and forth relative to the magnetic field sensor 20 along a linear path 30 (e.g., in the x-direction).

The magnetic field sensor 20 measures the magnetic field emanating from the magnet 10. The magnetic field is a vector field, wherein the magnetic field lines or the magnetic field vectors are represented in the form of dashed lines. The magnetic field vectors impinge on the magnetic field sensor 20 at a certain angle $\alpha$, and this angle $\alpha$ can be measured by the magnetic field sensor 20. The angle $\alpha$ is also referred to herein as the magnetic field vector angle, and its calculation will be described in greater detail later.

As can now be seen in FIG. 1, the distance (e.g., in the z-direction) between the magnet 10 and the magnetic field sensor 20 can vary, which is indicated by the double-headed arrow 40. As mentioned at the outset, this distance between the magnet 10 and the magnetic field sensor 20 is also called the airgap.

A change in the airgap now causes the magnetic field lines or the magnetic field vectors to impinge on the magnetic field sensor 20 at different angles $\alpha$. In the position of the magnet 10 shown in FIG. 1, the magnetic field vectors impinge on the magnetic field sensor 20 at a certain angle $\alpha_2$. If the airgap is now reduced, e.g., if the magnet 10 moves closer to the magnetic field sensor 20, the magnetic field lines or magnetic field vectors of the magnet 10 also shift. In the example shown here, the upper magnetic field lines would then impinge on the magnetic field sensor 20 at the drawn angle $\alpha_1$, where $\alpha_1 < \alpha_2$. That is to say, a change in the airgap (shown by the double-headed arrow 40) results in a corresponding shift in the magnetic field lines passing through the magnetic field sensor 20 (shown by the double-headed arrow 50).

Figure 2A:
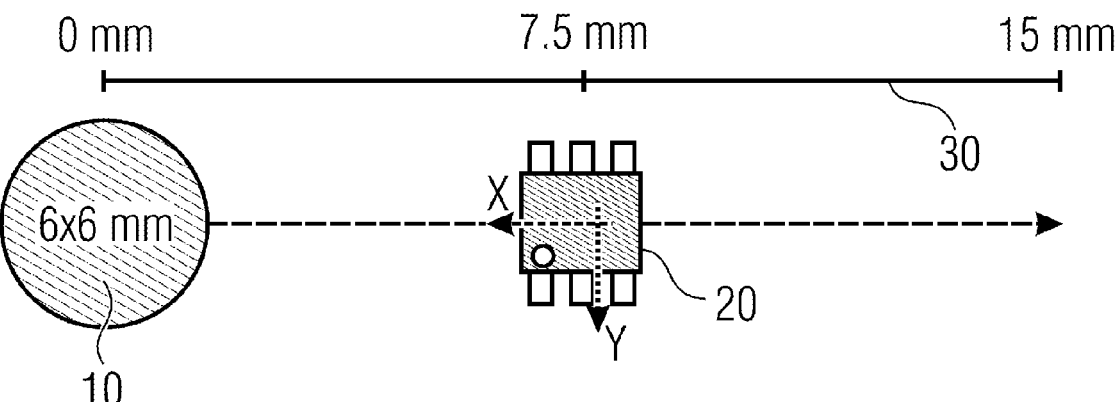
FIG. 2A shows a schematic plan view of a conventional magnetic-field-based position determination device.
Figure 2B:
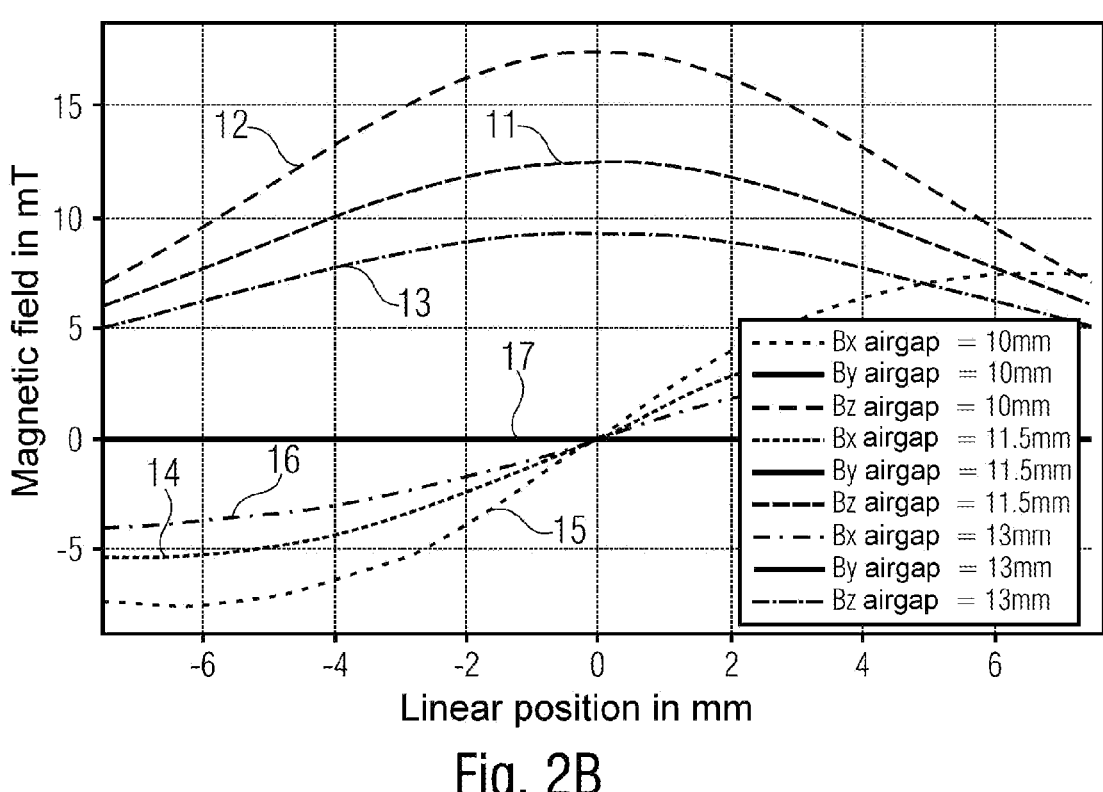
FIG. 2B shows a schematic diagram showing the magnetic field strengths as measured by the position determination device shown in FIG. 2A.
Figure 2C:
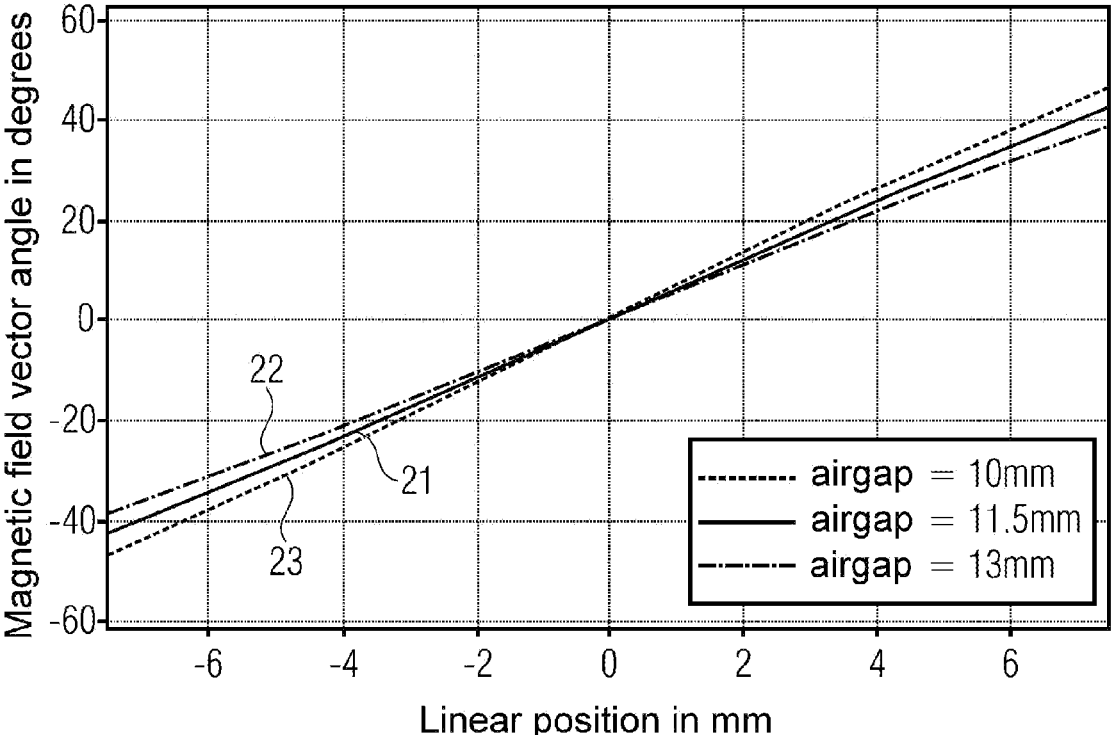
FIG. 2C shows the measurement error, which depends on the airgap between the magnet and the sensor device from FIG. 2A, resulting from the measurement, FIGS. 3A and 3B each show schematic side views of a magnetic-field-based position determination device according to an example implementation.

In practice, this leads to sometimes not insignificant deviations of the measurement results. With reference to FIGS. 2A to 2C, an example is discussed to illustrate the dependence of the measurement data on the airgap.

FIG. 2A shows a measurement setup with a magnet 10 and a magnetic field sensor 20. The magnet 10 is movable along the x-axis between 0 mm and 15 mm along a linear path 30 relative to the magnetic field sensor 20. The magnet 10 is spaced apart here from the magnetic field sensor 20 in the z-direction. This spacing in the z-direction corresponds to the airgap discussed previously.

The magnetic field sensor 20 now measures the magnetic field emanating from the magnet 10 in the x-direction (Bx), in the y-direction (By) and in the z-direction (Bz) over the entire travel distance (e.g., between 0 mm and 15 mm). FIG. 2B shows the measured magnetic fields Bx, By, Bz with different airgaps. The curve 11 shows the course of the field strength Bz measured in the z-direction over the travel distance (0 mm to 15 mm) at an airgap of 11.5 mm.

By comparison, the curve 12 shows the course of the field strength Bz measured in the z-direction over the travel distance (0 mm to 15 mm) with an airgap of 10 mm. Since the magnet 10 is closer to the magnetic field sensor 20 here, an increased magnetic field strength Bz is measured over the entire travel distance compared to curve 11.

By comparison, curve 13 shows the course of the field strength Bz measured in the z direction over the travel distance (0 mm to 15 mm) with an airgap of 13 mm. Since the magnet 10 is further away from the magnetic field sensor 20 here, a reduced magnetic field strength Bz is measured over the entire travel distance compared to curve 11.

The course of the magnetic field strength Bx measured in the x-direction is also analogous. For example, curve 14 shows the course of the field strength Bx measured in the x-direction over the travel distance (0 mm to 15 mm) with an air gap of 11.5 mm.

By comparison, curve 15 shows the course of the field strength Bx measured in the x-direction over the travel distance (0 mm to 15 mm) with an air gap of 10 mm. Since the magnet 10 is closer to the magnetic field sensor 20 here, an increased magnetic field strength Bx is measured over the entire travel distance compared to curve 14.

By comparison, curve 16 shows the course of the field strength Bx measured in the x-direction over the travel distance (0 mm to 15 mm) with an airgap of 13 mm. Since the magnet 10 is further away from the magnetic field sensor 20 here, a reduced magnetic field strength Bx is measured over the entire travel distance compared to curve 14.

Curve 17 shows the course of the magnetic field strength By measured in the y-direction. Since the magnet 10 does not move in the y-direction, the magnetic field strength By does not change or remains the same. The magnetic field strength in the y-direction can therefore be ignored or set to zero.

The magnetic field strength Bx measured in the x-direction and the magnetic field strength Bz measured in the z-direction can now be combined using corresponding trigonometric functions in order to calculate the magnetic field vector angle $\alpha$. The exact calculation of the magnetic field vector angle $\alpha$ is described in greater detail below.

In the diagram shown in FIG. 2C the calculated magnetic field vector angles $\alpha$ are plotted. The y-axis shows the magnetic field vector angles $\alpha$ calculated via the magnetic field strength Bx, Bz, which are mapped to a corresponding linear position of the magnet (x-axis). That is to say, each value of the calculated magnetic field vector angle $\alpha$ corresponds exactly to a value indicating the current actual position of the magnet 10 relative to the magnetic field sensor 20.

Curve 21 shows the course of the calculated magnetic field vector angle α over the entire travel distance at the airgap of 11.5 mm mentioned previously (FIG. 2B). Curve 22 shows the course of the magnetic field vector angle α at the larger airgap of 13.5 mm. Curve 23 shows the course of the magnetic field vector angle α at the smaller airgap of 10 mm.

As can be seen, for example, a magnetic field vector angle of α=0° corresponds to a linear position of 0. Here, all three curves 21, 22, 23 are at the same point, which can be explained in part by the fact that the magnet 10 is exactly opposite the magnetic field sensor 20, so that the magnetic field vectors pass through the magnetic field sensor 20 substantially perpendicularly.

The further the magnet 10 moves away from the magnetic field sensor 20, the more the measurement results deviate from each other. For example, with an airgap of 11.5 mm, a calculated magnetic field vector angle α=30° corresponds to a current actual position of the magnet 10 of about 5 mm (see curve 21). However, with a larger airgap, here 13.5 mm, the same magnetic field vector angle α=30° corresponds to a current actual position of the magnet 10 of approximately 5.7 mm (see curve 22). With a smaller airgap, here 10 mm, the same magnetic field vector angle α=30° again corresponds to a current actual position of the magnet 10 of approximately 4.4 mm (see curve 23).

From this it can be seen that different airgaps with a difference of only a few millimeters (e.g., ±1.5 mm) already lead to measurement deviations in the range of approximately 10%. Since the position of the magnet 10 is determined based on the measured magnetic field vector angle α, the measured position of the magnet 10 also deviates by approximately 10% from the actual position of the magnet 10.

To solve this problem, according to the innovative concept described herein, a magnetic-field-based position determination device and a method for position determination using such a magnetic-field-based position determination device are proposed.

Figure 3A:
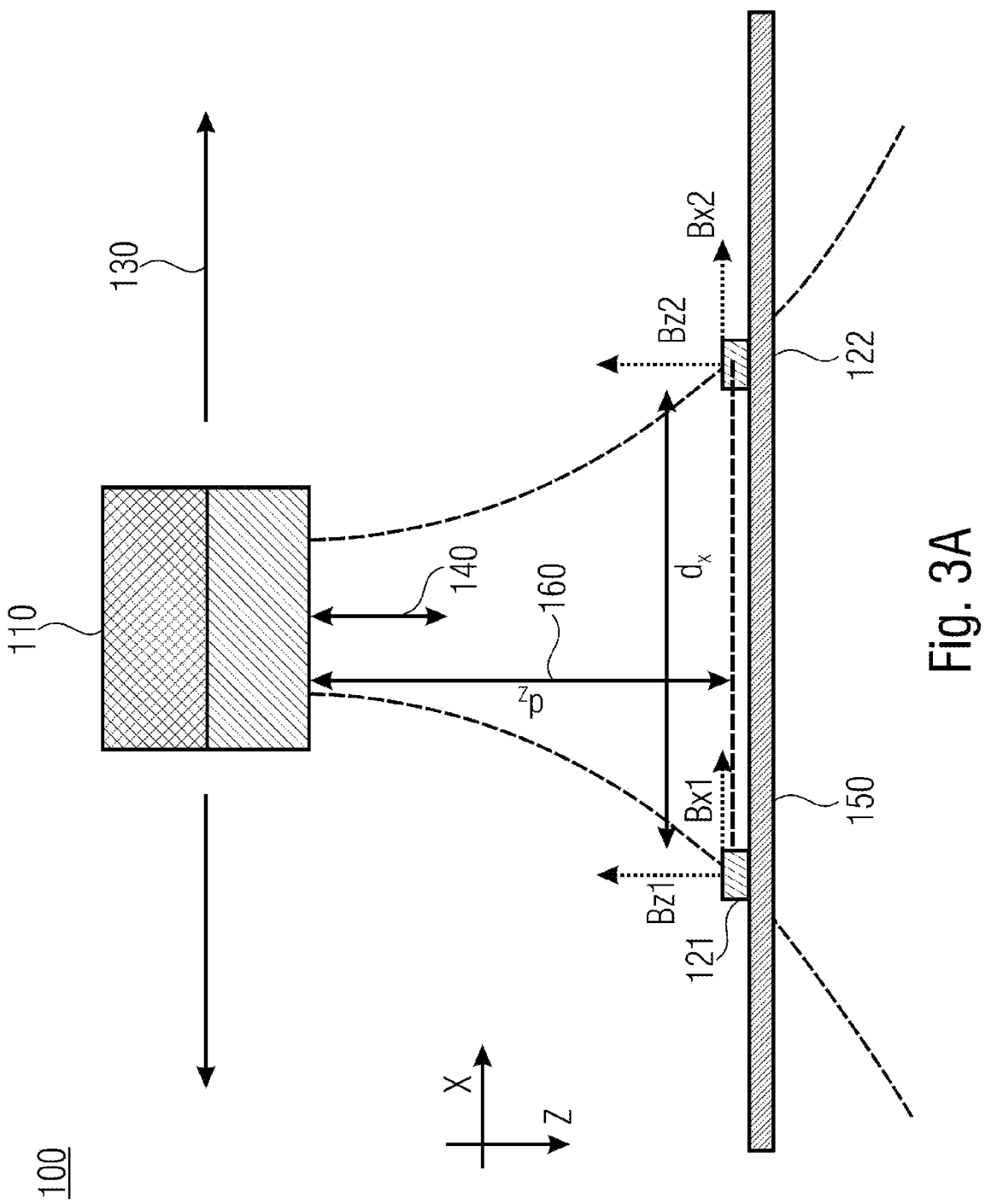
Figure 3B:
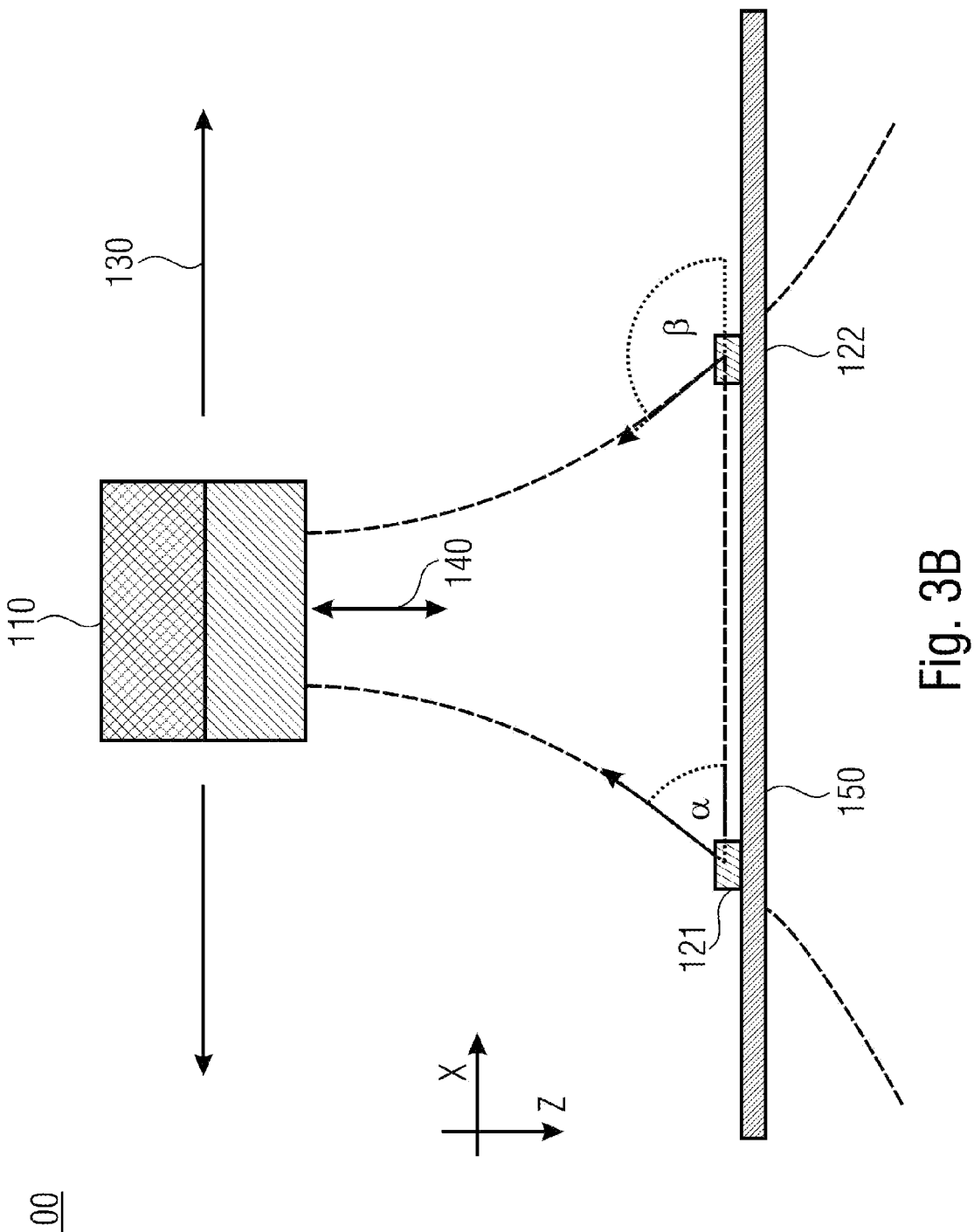

FIGS. 3A and 3B show a non-limiting example implementation of such a magnetic-field-based position determination device 100. The magnetic-field-based position determination device 100 is similar in structure to the position determination device described with reference to FIG. 1.

However, a significant difference is that two magnetic field sensors 121, 122 are provided here. More specifically, the magnetic-field-based position determination device 100 has a sensor device 120 with a first magnetic field sensor 121 and a second magnetic field sensor 122.

The two magnetic field sensors 121, 122 can be arranged on a common substrate 150. The substrate 150 can, for example, be a printed circuit board (PCB). In this case, the two magnetic field sensors 121, 122 could be constructed as separate components. Alternatively, it would be conceivable for the substrate 150 to be in the form of a semiconductor substrate, for example as a silicon substrate. In this case, the two magnetic field sensors 121, 122 could be monolithically integrated in the semiconductor substrate.

The magnetic field sensors 121, 122 are arranged spaced apart from each other by a distance $d_x$. This distance $d_x$ between the two magnetic field sensors 121, 122 is also referred to as the pitch. The distance $d_x$ corresponds to a, with respect to the substrate plane, lateral spacing, e.g., the two magnetic field sensors 121, 122 are laterally spaced apart on the substrate 150. In FIGS. 3A and 3B, a coordinate system is drawn as an example. Here, the two magnetic field sensors 121, 122 are spaced apart from each other in the x-direction, e.g., horizontally.

The magnetic-field-based position determination device 100 comprises a magnet 110 that is movable relative to the two magnetic field sensors 121, 122. For example, the magnet 110 may be movable along a linear path 130, e.g., the magnet 110 may move linearly, preferably back and forth. Thus, the magnet 110 may perform a linear movement characterized, among other things, by an object (here: the magnet 110) moving in a straight line along the shortest path between two points. The linear movement can, for example, take place in exactly one spatial direction. However, it would also be conceivable that the magnet 110 moves past the two magnetic field sensors 121, 122 on a circular path, or on any spatial path. The only important thing here is that the magnetic field lines of the magnet 110 pass through the two magnetic field sensors 121, 122.

For example, as shown in FIGS. 3A and 3B, the magnet 110 may move linearly across both magnetic field sensors 121, 122. According to the coordinate system drawn here as an example, the magnet 110 can move in the x-direction, for example. In order for the magnet 110 to move across both magnetic field sensors 121, 122, the two magnetic field sensors 121, 122 may be spaced apart in the same direction in which the magnet 110 moves. That is to say, the two magnetic field sensors 121, 122 may also be spaced apart from each other in the x-direction.

In a direction perpendicular to the linear path 130 or to the direction of movement of the magnet 110, the magnet 110 may be spatially spaced from the two magnetic field sensors 121, 122. In the example shown here, the magnet 110 can thus be spaced in the z-direction, e.g., vertically, from the two magnetic field sensors 121, 122. This distance $d_z$ would correspond to the previously described airgap 160 between the magnet 110 and the magnetic field sensors 121, 122. Here, too, the magnet 110 may have a variable airgap 160, for example due to mounting tolerances, which is symbolized by the arrow with the reference sign 140.

Each of the two magnetic field sensors 121, 122 can be configured to detect the magnetic field emanating from the magnet 110 in at least two spatial directions. Such magnetic field sensors 121, 122 are also referred to as 2D sensors. However, it would also be conceivable that the two magnetic field sensors 121, 122 can each measure the magnetic field in all three spatial directions. Such magnetic field sensors 121, 122 can, in turn, be referred to as 3D sensors.

The magnetic field sensors 121, 122 can, for example, be configured as Hall sensors, e.g., in the form of 3D Hall sensors. Alternatively, it would be conceivable for the two sensors to be configured as magnetoresistive sensors, also known as xMR sensors.

FIG. 3A shows an example of the magnetic field Bx parallel to the direction of movement 130 of the magnet 110, and also the magnetic field Bz perpendicular to the direction of movement 130 of the magnet 110. These two magnetic fields Bx, Bz undergo a measurable change when the magnet 110 moves.

For example, the first magnetic field sensor 121, 122 may be configured to measure a first magnetic field Bx1 parallel (e.g., in the x-direction) to the direction of movement 130 of the magnet 110, and a second magnetic field Bz1 perpendicular (e.g., in the z-direction) to the direction of movement 130 of the magnet 110.

Similarly, the second magnetic field sensor 122 may be configured to measure a third magnetic field Bx2 parallel (e.g., in the x-direction) to the direction of movement 130 of the magnet 110, and a fourth magnetic field Bz2 perpendicular (e.g., in the z-direction) to the direction of movement 130 of the magnet 110.

The first magnetic field sensor 121 can be configured to calculate a first magnetic field vector angle α based on the first magnetic field Bx1 and the second magnetic field Bz1. For this purpose, the first magnetic field sensor 121 can set the respective measured magnetic fields Bx1 and Bz1 in relation to each other via a trigonometric function. For example, the first magnetic field vector angle α can be calculated as follows using the arc tangent function:

$$\alpha = a \tan 2(Bx1, Bz1)$$

The same applies for the second magnetic field sensor 122, which can be configured to calculate a second magnetic field vector angle β based on the third magnetic field Bx2 and the fourth magnetic field Bz2. For this purpose, the second magnetic field sensor 122 can set the measured magnetic fields Bx2 and Bz2 in relation to each other via a trigonometric function. For example, the second magnetic field vector angle β may be calculated as follows using the arc tangent function:

$$\beta = a \tan 2(Bx2, Bz2)$$

The two calculated magnetic field vector angles α, β are shown in FIG. 3B. Here it can be seen that the first magnetic field sensor 121 is traversed by the magnetic field lines at an angle α, and that the second magnetic field sensor 122 is traversed by the magnetic field lines at an angle β. As mentioned at the outset, a magnetic field is a vector field, so that the direction of the magnetic field lines can be determined. For this reason, these angles α, β are also called magnetic field vector angles. Accordingly, the respective magnetic field vector angles α, β indicate the angle at which the magnetic field lines pass through the respective magnetic field sensor 121, 122. This changes depending on the position of the magnet 110 relative to the magnetic field sensors 121, 122.

The magnetic-field-based position determination device 100 may determine the current actual position of the movable magnet 110 based on the two magnetic field vector angles α, β. The position of the magnet 110 may be determined here as a function of the two magnetic field vector angles α, β according to:

$$position = f(\alpha, \beta)$$

According to the innovative concept described herein, the magnetic-field-based position determination device 100 is configured to determine the current actual position of the movable magnet 110 based on the two magnetic field vector angles α, β and the pitch, e.g., the distance $d_x$ between the two magnetic field sensors 121, 122. That is to say, the current position of the magnet 110 can be determined as a function of the magnetic field vector angles α, β and the pitch $d_x$, according to the following:

$$position = f(\alpha, \beta, dx)$$

This means that the position of the magnet 110 can be determined independently of its magnetic field strength and/or its geometry. In addition, the vertical distance $d_z$ between the magnet 110 and the magnetic field sensors 121, 122 is not included in the equation. That is to say, the position of the magnet 100 can be determined independently of the airgap 160.

In practice, this offers decisive advantages because, on the one hand, the pitch between two magnetic field sensors 121,

122 can be measured very precisely and, on the other hand, there is no need to calibrate the set airgap 160.

The current actual position of the magnet 110 relative to the magnetic field sensors 121, 122 of the sensor arrangement 120 can now be determined, for example, using triangulation. The triangulation can be performed based on the determined magnetic field vector angles α, β and the distance $d_x$ between the magnetic field sensors 121, 122.

One way to determine the current actual position based on the factors α, β and $d_x$ would be, for example, a calculation according to the following rule:

$$position = \frac{dx}{2} \cdot \frac{\alpha + \beta}{\alpha - \beta}$$

That is to say, the current actual position of the magnet 110 can be calculated by multiplying half of the pitch $d_x$ by the result of dividing the sum of the magnetic field vector angles α, β divided by the difference of the magnetic field vector angles α, β.

According to the innovative concept described here, the pitch $d_x$ is one of the factors used in the equation to determine the current actual position of the magnet 110. For example, the pitch $d_x$ can be between 1 mm and 20 mm. In one conceivable implementation, the first and second magnetic field sensors 121, 122 may be provided, for example, as separate components or parts that may be arranged side by side on a substrate (e.g., on a PCB). In this case, the pitch $d_x$, e.g., the distance between the two magnetic field sensors 121, 122, could be, for example, 5 mm to 10 mm.

In an alternative implementation, the two magnetic field sensors 121, 122 could be configured as integrated circuits that can be monolithically integrated in a semiconductor substrate. In this case, the pitch $d_x$, e.g., the distance between the two magnetic field sensors 121, 122, could be 1 mm to 5 mm, for example.

Figure 4:
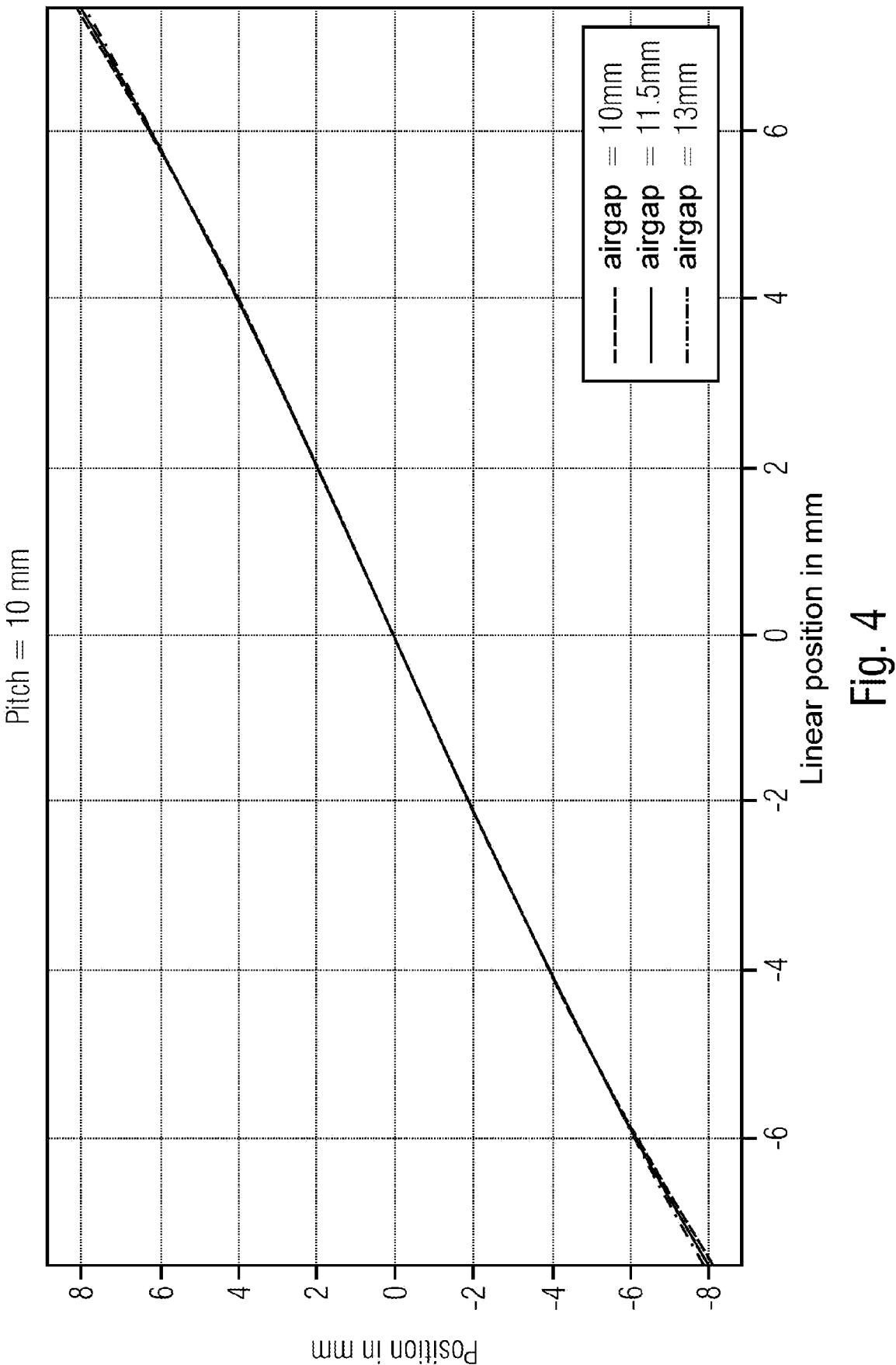
FIG. 4 shows a schematic diagram showing the airgap-independent measurement error at a pitch of 10 mm.
Figure 5:
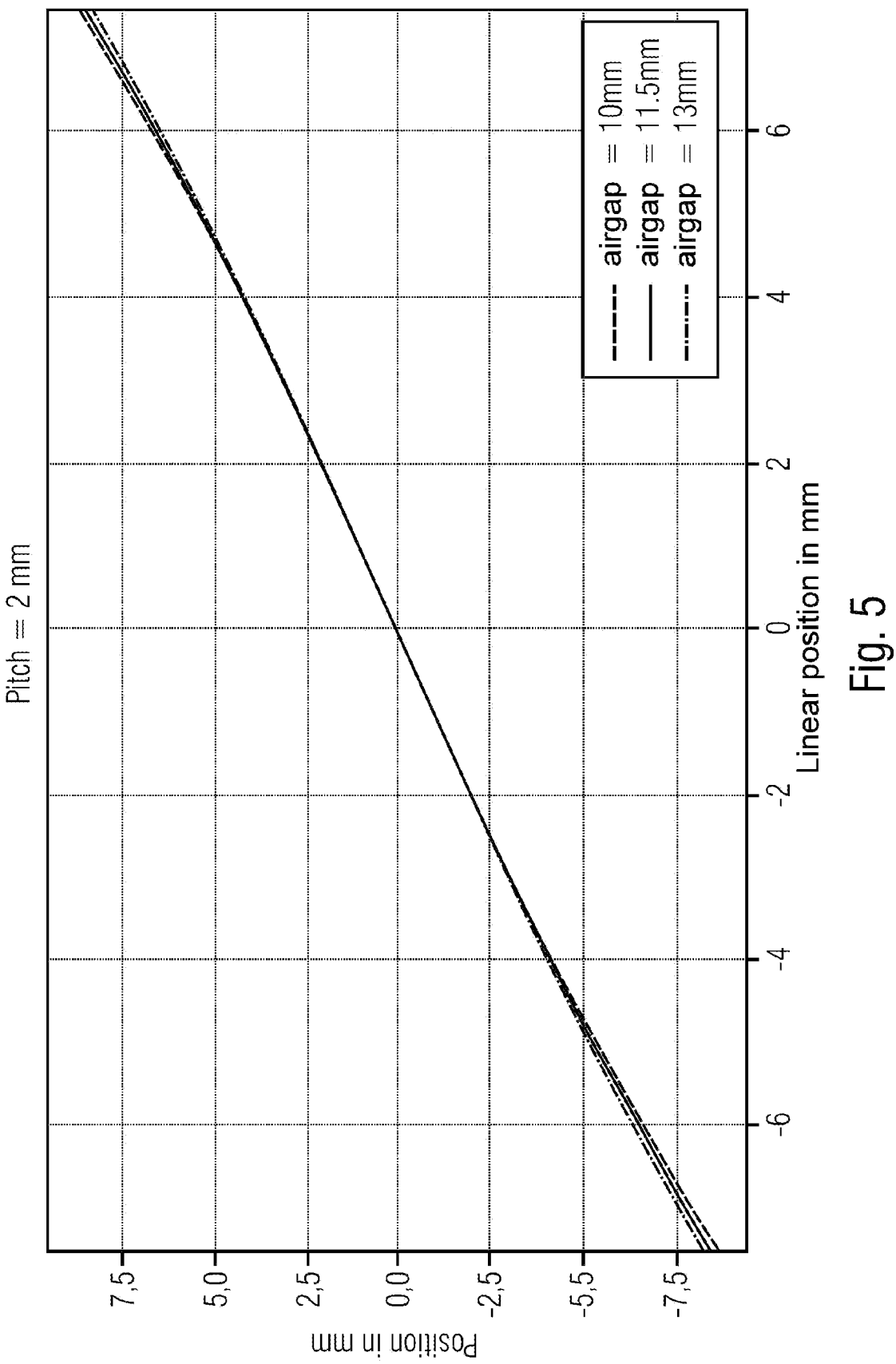
FIG. 5 shows a schematic diagram showing the airgap-independent measurement error at a pitch of 2 mm.

FIGS. 4 and 5 show simulation results of the innovative concept with a pitch of $d_x$=10 mm (FIG. 4) and a pitch of $d_x$=2 mm (FIG. 5). In both simulations, an airgap of 10 mm, an airgap of 11.5 mm and an airgap of 13 mm were simulated. On the x-axis there is plotted the position of the magnet 110, measured using the concept described herein. The actual position of the magnet 110 is plotted on the y-axis.

As can be seen in both FIG. 4 and FIG. 5, the measurement results of the calculated position of the magnet 110 (x-axis) deviate only marginally, e.g., by less than 1%, from the actual position of the magnet 110 (y-axis). Accordingly, it can be seen that the innovative concept described herein is applicable over a wide range of different pitches or distances $d_x$ between two magnetic field sensors 121, 122. But further still, it can be seen that both in a hybrid implementation and in a monolithic integration of the magnetic field sensors 121, 122, the determination of the current actual position of the magnet 110 is largely independent of the airgap 160 between the magnet 110 and the magnetic field sensors 121, 122 of the sensor arrangement 120.

The error is slightly larger in the monolithic integration (FIG. 5) compared to the hybrid design (FIG. 4). However, two magnetic field sensors 121, 122 integrated within one chip can be used particularly advantageously not only to compensate for the airgap 160 described herein, but also optionally in addition to compensate for stray fields, as well as to achieve redundancy. This would be a practical application for configuring a single piece of hardware (e.g., the sensor arrangement 120 with the at least two magnetic field sensors 121, 122) for different applications, for example, by adapting the means for evaluating the measurement results.

Figure 6:
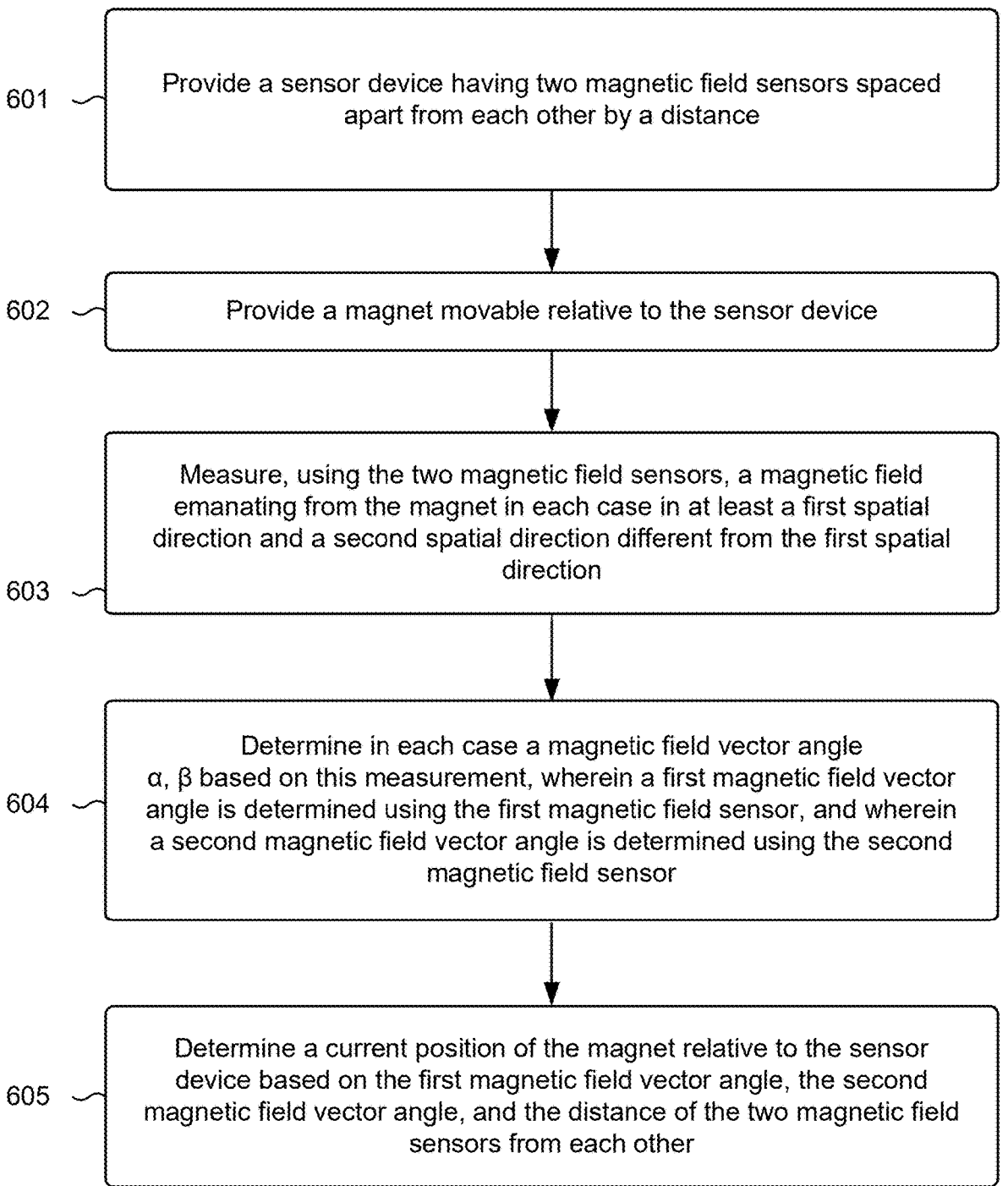
FIG. 6 shows a schematic block diagram of a method according to the innovative concept described herein.

Lastly, FIG. 6 shows another schematic block diagram of a method according to the innovative concept disclosed herein for position determination using a magnetic-field-based position determination device 100.

In block 601, a sensor device 120 having at least two magnetic field sensors 121, 122, spaced apart by a distance $d_x$, is first provided.

In block 602, a magnet 110 movable relative to the sensor device 120 is provided.

In block 603, the magnetic field emanating from the magnet 110 is measured, more specifically using the individual magnetic field sensors 121, 122 in at least a first spatial direction (e.g., z-direction) and a second spatial direction (e.g., x-direction) different therefrom, respectively.

Subsequently, a magnetic field vector angle α, β is determined in block 604 based on the magnetic field measurement. A first magnetic field vector angle α is determined using the first magnetic field sensor 121, and a second magnetic field vector angle β is determined using the second magnetic field sensor 122.

In block 605, the current position of the magnet 110 relative to the sensor device 120 is determined based on the determined magnetic field vector angles α, β and the distance $d_x$ between the two magnetic field sensors 121, 122.

In summary, example implementations of the innovative concept described herein can be used to implement airgap-independent magnetic-field-based linear position measurements.

In the example implementations discussed herein, the sensor device 120 has two magnetic field sensors 121, 122 merely by way of example. However, it is also conceivable that the sensor device 120 has more than two magnetic field sensors. Furthermore, the coordinate system drawn in the figures serves merely as an example illustration of the respective spatial directions or orientations. It will be understood that if the coordinate system is rotated accordingly, the x, y, and z axes may be reversed, however, the description disclosed herein is nevertheless fully valid.

The example implementations described above are merely illustrative of the principles of the innovative concept described herein. It is understood that modifications and variations of the arrangements and details described herein will be apparent to others skilled in the art. Therefore, it is intended that the concept described herein be limited only by the scope of protection of the claims below and not by the specific details presented by way of the description and explanation of the example implementations herein.

Although some aspects have been described in conjunction with a device, it is understood that these aspects also represent a description of the corresponding method, so that a block or component of a device is also to be understood as a corresponding method step or a feature of a method step. Similarly, aspects described in conjunction with or as a method step also constitute a description of a corresponding block or detail or feature of a corresponding device.

Some or all of the method steps may be performed by a hardware apparatus (or using a hardware apparatus), such as a microprocessor, a programmable computer, or an electronic circuit. In some example implementations, some or more of the key method steps may be performed by such an apparatus.

Depending on particular implementation requirements, example implementations may be implemented in hardware or in software or at least partially in hardware or at least partially in software. The implementation may be performed using a digital storage medium, for example, a floppy disk, a DVD, a BluRay disc, a CD, a ROM, a PROM, an EPROM, an EEPROM, or a FLASH memory, a hard disk, or any other magnetic or optical storage medium on which electronically readable control signals are stored that can or do interact with a programmable computer system in such a way that the particular method is performed. Therefore, the digital storage medium may be computer readable.

Thus, some example implementations include a data carrier having electronically readable control signals capable of interacting with a programmable computer system such that any of the methods described herein are performed.

Generally, example implementations may be implemented as a computer program product having program code, wherein the program code is operative to perform any of the methods when the computer program product is running on a computer.

For example, the program code may also be stored on a machine-readable medium.

Other example implementations include the computer program for performing any of the methods described herein, wherein the computer program is stored on a machine-readable medium. In other words, an example implementation of the method described herein is thus a computer program comprising program code for performing any of the methods described herein when the computer program is running on a computer.

Thus, another example implementation of the method described herein is a data carrier (or digital storage medium or computer-readable medium) on which the computer program for performing any of the methods described herein is recorded. The data carrier or digital storage medium or computer-readable medium is typically tangible and/or non-volatile.

Thus, in another example implementation of the method described herein, a data stream or sequence of signals is the computer program for performing any of the methods described herein. For example, the data stream or sequence of signals may be configured to be transferred over a data communication link, for example over the Internet.

Another example implementation comprises a processing device, for example a computer or programmable logic device, configured or adapted to perform any of the methods described herein.

Another example implementation comprises a computer having, installed thereon, the computer program for performing any of the methods described herein.

Another example implementation comprises a device or system configured to transmit a computer program for performing at least one of the methods described herein to a receiver. The transmission may be, for example, electronic or optical. The receiver may be, for example, a computer, mobile device, storage device, or similar device. The device or system may comprise, for example, a file server for transmitting the computer program to the receiver.

In some example implementations, a programmable logic device (for example, a field-programmable gate array, an FPGA) may be used to perform some or all of the functionalities of the methods described herein. In some example implementations, a field-programmable gate array may interact with a microprocessor to perform any of the methods described herein. In general, in some example implementations, the methods are performed on the part of any hardware device. This may be general-purpose hardware, such as a computer processor (CPU), or hardware that is specific to the method, such as an ASIC.

Aspects

The following provides an overview of some Aspects of the present disclosure:

Aspect 1: A magnetic-field-based position determination device, comprising: a sensor device with two magnetic field sensors arranged spaced apart from each other by a first distance, wherein the two magnetic field sensors include a first magnetic field sensor and a second magnetic field sensor; and a magnet movable relative to the sensor device, wherein each of the two magnetic field sensors is configured to measure a magnetic field emanating from the magnet in at least a first spatial direction and a second spatial direction different from the first spatial direction, and, based on the measured magnetic field, determine a first magnetic field vector angle and a second magnetic field vector angle, respectively, wherein the first magnetic field sensor is configured to determine a first magnetic field vector angle, and wherein the second magnetic field sensor is configured to determine a second magnetic field vector angle, and wherein the sensor device is configured to determine a current position of the magnet relative to the sensor device based on the first magnetic field vector angle, the second magnetic field vector angle, and the first distance of the two magnetic field sensors from each other.

Aspect 2: The magnetic-field-based position determination device as recited in Aspect 1, wherein the magnet is movable along the second spatial direction, and wherein the two magnetic field sensors are spaced apart from each other along the second spatial direction by the first distance.

Aspect 3: The magnetic-field-based position determination device as recited in any of Aspects 1-2, wherein the magnet is configured to perform a linear movement relative to the sensor device.

Aspect 4: The magnetic-field-based position determination device as recited in any of Aspects 1-3, wherein the magnet is spaced apart from the sensor device in the first spatial direction by a second distance, and wherein the sensor device is configured to determine the current position of the magnet independently of the second distance between the magnet and the sensor device.

Aspect 5: The magnetic-field-based position determination device as recited in any of Aspects 1-4, wherein the sensor device is configured to determine the current position of the magnet independently of at least one of a magnetic field strength of the magnet or a geometry of the magnet.

Aspect 6: The magnetic-field-based position determination device as recited in any of Aspects 1-5, wherein the sensor device is configured to determine the current position of the magnet using triangulation based on the first magnetic field vector angle, the second magnetic field vector angle, and the first distance between the two magnetic field sensors.

Aspect 7: The magnetic-field-based position determination device as recited in any of Aspects 1-6, wherein the current position of the magnet is determined by combining the first magnetic field vector angle, the second magnetic field vector angle, and the first distance between the two magnetic field sensors as follows: current position=$d2 \cdot \alpha + \beta\alpha - \beta$ where $\alpha$ is the first magnetic field vector angle, $\beta$ is the second magnetic field vector angle, and d is the first distance.

Aspect 8: The magnetic-field-based position determination device as recited in any of Aspects 1-7, wherein the first magnetic field sensor is configured to determine the first magnetic field vector angle by setting the magnetic field measured by the first magnetic field sensor in the first spatial direction and the magnetic field measured by the first magnetic field sensor in the second spatial direction in relation to each other via a first trigonometric function, and wherein the second magnetic field sensor is configured to determine the second magnetic field vector angle by setting the magnetic field measured by the second magnetic field sensor in the first spatial direction and the magnetic field measured by the second magnetic field sensor in the second spatial direction in relation to each other via a second trigonometric function.

Aspect 9: The magnetic-field-based position determination device as recited in Aspect 8, wherein the first and the second trigonometric functions are arc tangent functions, such that: $\alpha$=a tan 2(Bxsensor1, Bzsensor1), $\beta$=a tan 2(Bxsensor2, Bzsensor2), where $\alpha$ is the first magnetic field vector angle, $\beta$ is the second magnetic field vector angle, Bzsensor1 is the magnetic field measured by the first magnetic field sensor in the first spatial direction, Bxsensor1 is the magnetic field measured by the first magnetic field sensor in the second spatial direction, Bzsensor2 is the magnetic field measured by the second magnetic field sensor in the first spatial direction, and Bxsensor2 is the magnetic field measured by the second magnetic field sensor in the second spatial direction.

Aspect 10: The magnetic-field-based position determination device as recited in any of Aspects 1-9, wherein the two magnetic field sensors are constructed as separate components arranged on a substrate for hybrid integration.

Aspect 11: The magnetic-field-based position determination device as recited in any of Aspects 1-10, wherein the two magnetic field sensors are monolithically integrated in a common chip substrate.

Aspect 12: The magnetic-field-based position determination device as recited in any of Aspects 1-11, wherein the two magnetic field sensors are two-dimensional or three-dimensional Hall sensors.

Aspect 13: The magnetic-field-based position determination device as recited in any of Aspects 1-12, wherein the two magnetic field sensors are magnetoresistive sensors.

Aspect 14: A method for position determination using a magnetic-field-based position determination device, wherein the method comprises: providing a sensor device having two magnetic field sensors spaced apart from each other by a distance, wherein the two magnetic field sensors include a first magnetic field sensor and a second magnetic field sensor, providing a magnet movable relative to the sensor device, measuring, using the two magnetic field sensors, a magnetic field emanating from the magnet in each case in at least a first spatial direction and a second spatial direction different from the first spatial direction, and determining in each case a magnetic field vector angle $\alpha$, $\beta$ based on this measurement, wherein a first magnetic field vector angle is determined using the first magnetic field sensor, and wherein a second magnetic field vector angle is determined using the second magnetic field sensor, and determining a current position of the magnet relative to the sensor device based on the first magnetic field vector angle, the second magnetic field vector angle, and the distance of the two magnetic field sensors from each other.

Aspect 15: A non-transitory computer-readable medium comprising a computer program having a program code for causing a programmable hardware device to execute a method for position determination using a magnetic-field-based position determination device, the method comprising: providing a sensor device having two magnetic field sensors spaced apart from each other by a distance, wherein the two magnetic field sensors include a first magnetic field sensor and a second magnetic field sensor; providing a magnet movable relative to the sensor device; measuring, using the two magnetic field sensors, a magnetic field emanating from the magnet in each case in at least a first spatial direction and a second spatial direction different from the first spatial direction, and determining in each case a magnetic field vector angle α, β based on this measurement, wherein a first magnetic field vector angle is determined using the first magnetic field sensor, and wherein a second magnetic field vector angle is determined using the second magnetic field sensor; and determining a current position of the magnet relative to the sensor device based on the first magnetic field vector angle, the second magnetic field vector angle, and the distance of the two magnetic field sensors from each other.

Aspect 16: A system configured to perform one or more operations recited in one or more of Aspects 1-15.

Aspect 17: An apparatus comprising means for performing one or more operations recited in one or more of Aspects 1-15.

Aspect 18: A non-transitory computer-readable medium storing a set of instructions, the set of instructions comprising one or more instructions that, when executed by a device, cause the device to perform one or more operations recited in one or more of Aspects 1-15.

Aspect 19: A computer program product comprising instructions or code for executing one or more operations recited in one or more of Aspects 1-15.

The invention claimed is:

1. A magnetic-field-based position determination device, comprising:
a sensor device with two magnetic field sensors arranged spaced apart from each other by a first distance, wherein the two magnetic field sensors include a first magnetic field sensor and a second magnetic field sensor, and wherein the two magnetic field sensors are two-dimensional or three-dimensional Hall sensors; and
a magnet movable relative to the sensor device,
wherein each of the two magnetic field sensors is configured to measure a magnetic field emanating from the magnet in at least a first spatial direction and a second spatial direction different from the first spatial direction, and, based on the measured magnetic field, determine a first magnetic field vector angle and a second magnetic field vector angle, respectively, wherein the first magnetic field sensor is configured to determine a first magnetic field vector angle, and wherein the second magnetic field sensor is configured to determine a second magnetic field vector angle, and
wherein the sensor device is configured to determine a current position of the magnet relative to the sensor device based on the first magnetic field vector angle, the second magnetic field vector angle, and based on the first distance of the two magnetic field sensors from each other.

2. The magnetic-field-based position determination device as claimed in claim 1,
wherein the magnet is movable along the second spatial direction, and
wherein the two magnetic field sensors are spaced apart from each other along the second spatial direction by the first distance.

3. The magnetic-field-based position determination device as claimed in claim 1,
wherein the magnet is configured to perform a linear movement relative to the sensor device.

4. The magnetic-field-based position determination device as claimed in claim 1,
wherein the magnet is spaced apart from the sensor device in the first spatial direction by a second distance, and
wherein the sensor device is configured to determine the current position of the magnet independently of the second distance between the magnet and the sensor device.

5. The magnetic-field-based position determination device as claimed in claim 1,
wherein the sensor device is configured to determine the current position of the magnet independently of at least one of a magnetic field strength of the magnet or a geometry of the magnet.

6. The magnetic-field-based position determination device as claimed in claim 1,
wherein the sensor device is configured to determine the current position of the magnet using triangulation based on the first magnetic field vector angle, the second magnetic field vector angle, and the first distance between the two magnetic field sensors.

7. The magnetic-field-based position determination device as claimed in claim 1,
wherein the current position of the magnet is determined by combining the first magnetic field vector angle, the second magnetic field vector angle, and the first distance between the two magnetic field sensors as follows:

$$\text{position} = \frac{d}{2} \cdot \frac{\alpha + \beta}{\alpha - \beta}$$

where α is the first magnetic field vector angle, β is the second magnetic field vector angle, and d is the first distance.

8. The magnetic-field-based position determination device as claimed in claim 1,
wherein the first magnetic field sensor is configured to determine the first magnetic field vector angle by setting the magnetic field measured by the first magnetic field sensor in the first spatial direction and the magnetic field measured by the first magnetic field sensor in the second spatial direction in relation to each other via a first trigonometric function, and
wherein the second magnetic field sensor is configured to determine the second magnetic field vector angle by setting the magnetic field measured by the second magnetic field sensor in the first spatial direction and the magnetic field measured by the second magnetic field sensor in the second spatial direction in relation to each other via a second trigonometric function.

9. The magnetic-field-based position determination device as claimed in claim 8,
wherein the first and the second trigonometric functions are arc tangent functions, such that:

$$\alpha = \text{atan } 2(Bx_{sensor1}, Bz_{sensor1}) = \text{atan } 2(Bx\_\text{sensor2}, Bz\_\text{sensor2}),$$

where α is the first magnetic field vector angle, β is the second magnetic field vector angle, $Bz_{sensor1}$ is the magnetic field measured by the first magnetic field sensor in the first spatial direction, $Bx_{sensor1}$ is the magnetic field measured by the first magnetic field sensor in the second spatial direction, $Bz_{sensor2}$ is the magnetic field measured by the second magnetic field sensor in the first spatial direction, and $Bx_{sensor2}$ is the magnetic field measured by the second magnetic field sensor in the second spatial direction.

10. The magnetic-field-based position determination device as claimed in claim 1, wherein the two magnetic field sensors are constructed as separate components arranged on a substrate for hybrid integration.

11. The magnetic-field-based position determination device as claimed in claim 1, wherein the two magnetic field sensors are monolithically integrated in a common chip substrate.

12. A method for position determination using a magnetic-field-based position determination device, wherein the method comprises:

providing a sensor device having two magnetic field sensors spaced apart from each other by a distance, wherein the two magnetic field sensors include a first magnetic field sensor and a second magnetic field sensor, and wherein the two magnetic field sensors are two-dimensional or three-dimensional Hall sensors, providing a magnet movable relative to the sensor device, measuring, using the two magnetic field sensors, a magnetic field emanating from the magnet in each case in at least a first spatial direction and a second spatial direction different from the first spatial direction, and determining in each case a magnetic field vector angle $\alpha$, $\beta$ based on this measurement, wherein a first magnetic field vector angle is determined using the first magnetic field sensor, and wherein a second magnetic field vector angle is determined using the second magnetic field sensor, and determining a current position of the magnet relative to the sensor device based on the first magnetic field vector angle, the second magnetic field vector angle, and the distance of the two magnetic field sensors from each other.

13. A non-transitory computer-readable medium comprising a computer program having a program code for causing a programmable hardware device to execute a method for position determination using a magnetic-field-based position determination device, the method comprising:

providing a sensor device having two magnetic field sensors spaced apart from each other by a distance, wherein the two magnetic field sensors include a first magnetic field sensor and a second magnetic field sensor, and wherein the two magnetic field sensors are two-dimensional or three-dimensional Hall sensors;

providing a magnet movable relative to the sensor device;

measuring, using the two magnetic field sensors, a magnetic field emanating from the magnet in each case in at least a first spatial direction and a second spatial direction different from the first spatial direction, and determining in each case a magnetic field vector angle $\alpha$, $\beta$ based on this measurement, wherein a first magnetic field vector angle is determined using the first magnetic field sensor, and wherein a second magnetic field vector angle is determined using the second magnetic field sensor; and determining a current position of the magnet relative to the sensor device based on the first magnetic field vector angle, the second magnetic field vector angle, and the distance of the two magnetic field sensors from each other.

* * * * *